Patented May 28, 1940

2,202,270

UNITED STATES PATENT OFFICE 2,202,270

PREPARATION OF SODIUM MONOXIDE

Norman D. Scott, Sanborn, N. Y., assignor to E. I. du Pont de Nemours & Company, Wilmington, Del., a corporation of Delaware No Drawing. Application May 8, 1939, Serial No. 272,402

5 Claims. (Cl. 23—184)

This invention relates to the production of sodium monoxide and more particularly to a method of producing sodium monoxide from sodium and sodium hydroxide.

Ordinarily sodium monoxide is prepared by oxidizing molten sodium with air or oxygen. In carrying out this method, difficulties are encountered when it is attempted to produce substantially pure sodium monoxide or sodium monoxide which is not contaminated with either unoxidized sodium or sodium peroxide. At the temperatures suitable for oxidation of sodium to monoxide, the monoxide, as formed, tends to react readily with oxygen to form the peroxide. On the other hand, if mild oxidizing conditions are used and it is attempted to avoid over-oxidation so as to prevent the formation of the peroxide, it is difficult to avoid the production of a product which contains substantial amounts of unreacted sodium, usually in the form of fine particles.

An object of the present invention is to provide an improved method for producing sodium monoxide which is substantially free from both unreacted sodium and sodium peroxide. A further object is to provide a process for producing sodium monoxide using as raw materials sodium and sodium hydroxide. Other objects will be apparent from the following description of my invention.

The above objects may be attained in accordance with the present invention by reacting a mixture of sodium, sodium hydroxide and sodium hydride. In order to carry out the process of my invention I add sodium hydride to a mixture of molten sodium hydroxide and molten sodium and while maintaining the mixture at a suitable elevated temperature I remove from the reaction zone the hydrogen which is evolved by the subsequent chemical reaction. In this way, I am able to obtain substantially pure sodium monoxide which contains no sodium peroxide and substantially no unreacted sodium. Under the conditions of my process no sodium peroxide can be formed so long as the reaction mixture is protected from the atmosphere and, by using the proper precautions, it is possible to obtain substantially complete reaction of the sodium.

I have determined that the reaction which takes place in carrying out my process is not a direct reaction between sodium and sodium hydroxide. The supposed reaction between the sodium and sodium hydroxide which has been reported in the literature may be represented as follows:

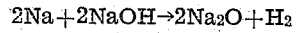

$$2Na + 2NaOH \rightarrow 2Na_2O + H_2$$

In the chemical literature certain authors have reported that this reaction occurs, while others have reported that sodium does not react with molten sodium hydroxide even at elevated temperatures. I have demonstrated by experiment that sodium does not react with sodium hydroxide when these two ingredients alone are mixed together at high temperatures. Thus, I have heated pure sodium hydroxide and pure sodium in equimolar proportions at temperatures up to 650° C. and found that no reaction whatsoever occurred. On the other hand, I have found that if a small amount of sodium hydride is added to the mixture, the reaction takes place immediately at the melting point of the sodium hydroxide, evolving hydrogen and causing the formation of sodium monoxide. The reactions which occur, I believe, may be represented by the following equations:

1. $2NaH + 2NaOH \rightarrow 2Na_2O + H_2$
2. $2Na + H_2 \rightarrow 2NaH$

Thus, by adding a small amount of sodium hydride to the fused mixture of sodium and sodium hydroxide, the reaction between the hydride and the hydroxide evolves hydrogen which reacts with the sodium present to form more hydride. Thus the reaction continues, until all of the sodium and sodium hydroxide have reacted. I have also found, however, that the reaction between sodium hydride and sodium hydroxide is a reversible reaction. Hence it is necessary continuously to remove hydrogen from the reaction mixture, at least during the latter part of the reaction, in order to obtain complete conversion of the sodium hydroxide to the monoxide.

In a preferred method of practicing my invention I may provide an equimolar, fused mixture of sodium and sodium hydroxide at a temperature of 400–600° C. under an atmosphere of hydrogen. The hydrogen readily reacts with the molten sodium present to form sodium hydride. Hydrogen is fed into the reaction mixture, under pressure if desired, preferably until the absorption of hydrogen by the reaction mixture is substantially complete, that is, until equilibrium between hydrogen absorption and hydrogen evolution at the existing pressure and temperature conditions has been reached. Then, while maintaining the reaction mixture at the aforesaid temperature, I remove hydrogen from the reaction zone as it is evolved. The hydrogen may be removed by various conventional means, for example, by placing the system under reduced pressure or by passing an inert gas such as nitrogen, argon or helium over or through the reaction mixture, either at atmospheric pressure or at pressures less or greater than one atmosphere. A period of from 2 to 6 hours may be required for the hydrogen absorption by the reaction mixture and a period of from 6 to 12 hours may be required in order to completely remove the hydrogen and thus permit the reaction to go to completion. In general these times are shortened as the reaction temperatures are increased. Preferably, the reaction mixture is stirred with a mechanical stirrer or by a stream of inert gas. By taking care to carry out the operation so as to substantially completely remove the hydrogen, substantially complete reaction can be obtained, thus producing sodium monoxide of high purity, e. g., 96–100% purity. If the reaction is not carried to completion, the sodium monoxide will be correspondingly less pure, having as the chief impurities sodium hydride and sodium hydroxide. If an excess of sodium hydroxide is used, when the reaction is carried to completion the sole impurity in the product may be sodium hydroxide. Thus, by using an excess of hydroxide it is possible to make a predetermined mixture of sodium monoxide and sodium hydroxide.

The preferred modification of my invention is described above merely by way of illustration. Various other modifications will be apparent to those skilled in chemical processes. For example, the amount of sodium hydride initially added or formed in the reaction mixture by hydrogen addition may be varied within the range of 1 to 50% by weight of the initial reaction mixture. Also, my invention is not restricted to carrying out the reaction at the aforesaid temperature range of 400–600° C. The reaction tends to occur more slowly at lower temperatures but the reaction temperatures should be not lower than the melting point of the sodium hydroxide. Temperatures above 600° C. also may be used and such elevated temperatures may be as high as desired, provided proper means are employed to retain the sodium in the reaction zone by the application of pressure or other suitable means when the temperature exceeds the atmospheric boiling point of sodium. In other words, the temperature should be kept below the boiling point of the sodium under the pressure conditions prevailing in the reaction zone.

One advantage of my improved process is that it provides cheaper raw materials for making sodium monoxide. In my process half of the sodium component of the product is obtained from the relatively cheap raw material sodium hydroxide. In prior methods it has been necessary to use sodium metal as the sole source of the sodium component of the sodium monoxide. The process is simple in operation and easily carried out in conventional apparatus. The apparatus may be constructed of steel, nickel, or other conventional materials which are resistant to alkalies at high temperatures.

I claim:

1. The process for the production of sodium monoxide which comprises reacting a mixture of sodium, sodium hydride and sodium hydroxide at a temperature which is below the boiling point of sodium at the prevailing pressure but not lower than the melting point of sodium hydroxide.

2. The process for the production of sodium monoxide which comprises reacting a mixture of sodium, sodium hydride and sodium hydroxide at a temperature of 400 to 600° C.

3. The process for the production of sodium monoxide which comprises reacting a mixture of sodium, sodium hydride and sodium hydroxide at a temperature which is below the boiling point of sodium at the prevailing pressure but not lower than the melting point of sodium hydroxide and removing hydrogen from the reaction zone.

4. The process for the production of sodium monoxide which comprises adding sufficient hydrogen to a fused mixture of sodium and sodium hydroxide to convert a part of said sodium to sodium hydride and then removing hydrogen from said mixture, while maintaining said mixture at a temperature which is below the boiling point of sodium at the prevailing pressure but not lower than the melting point of sodium hydroxide.

5. The process for the production of sodium monoxide which comprises adding hydrogen to a fused mixture of sodium and sodium hydroxide until absorption of hydrogen is substantially complete, and then maintaining the mixture at a temperature of 400 to 600° C. in a stream of inert gas until evolution of hydrogen therefrom is substantially complete.

NORMAN D. SCOTT.